Nov. 17, 1959 R. W. MELDRUM 2,913,202
CHRISTMAS TREE HOLDER
Filed Aug. 22, 1955

INVENTOR
Roy W. Meldrum
BY Robert M. Dunning
ATTORNEY

United States Patent Office 2,913,202
Patented Nov. 17, 1959

2,913,202

CHRISTMAS TREE HOLDER

Roy W. Meldrum, St. Paul, Minn.

Application August 22, 1955, Serial No. 529,658

4 Claims. (Cl. 248—44)

This invention relates to an improvement in Christmas tree stand and deals particularly with a device for holding a Christmas tree in an upright position.

Many types of Christmas tree stands have been produced and certain of these stands have been designed to contain water or a preservative compound. Stands designed for supporting large Christmas trees have sometimes been equipped with cup-shaped receptacle for containing water. These stands are usually conical or are provided at their lower ends with a tree impaling point designed to extend into the bottom of the tree trunk to properly locate the lower end of the trunk. The upper end of the receptacle has usually been provided with thumb screws or the like designed to engage against the trunk of the tree to hold the trunk in an upright position. Smaller trees have often been supported by stands of the type disclosed in my previous Patent No. 2,377,914 over which the present structure is an improvement.

An object of the present invention resides in the provision of a Christmas tree stand including a cup-shaped member which may be attached to the tree trunk when the tree is resting upon its side and a supporting part into which the cup-shaped member is inserted. This arrangement greatly simplifies the task of attaching a stand to the tree as the cup may be mounted upon the tree trunk prior to the time the tree is erected.

A feature of the present invention resides in the provision of a Christmas tree stand including a cup-shaped receptacle and a water containing receptacle into which the cup may be inserted. With this arrangement the cup may be attached to the tree trunk, the base of the stand may be filled with water or another preservative fluid and the cup may be inserted into the base to complete the erection process.

A feature of the present invention lies in the fact that the cup-shaped receptacle attached to the tree trunk is provided with fluid passages therethrough so that when the cup is inserted into the water filled base, the water may enter the cup and surround the tree trunk.

A further feature of the present invention resides in the particular means employed for holding the tree in a vertical position. The cup-shaped receptacle which is attached to the base of the trunk is provided with a series of angularly spaced clamping plates which are hinged along vertical pivots to the walls of the cup. These plates are provided on their inner edges with serrations or teeth designed to bite into the trunk along a vertical line of engagement. Means are provided for urging these plates inwardly so that the teeth thereupon will engage the tree trunk. By this arrangement the tree trunk is engaged along angularly spaced vertical lines of engagement. As a result the tree is properly supported to extend vertically when the cup is engaged in the base.

These and other objects and novel features of my invention will be more clearly and fully set forth in the following specification and claims.

In the drawings forming a part of the specification:

With reference to the drawings, like parts will be similarly indicated.

Figure 3:
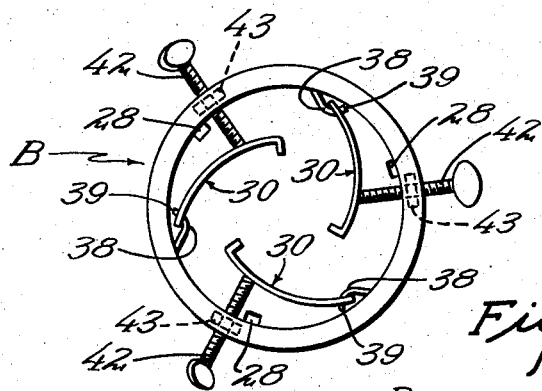
Figure 3 is a top plan view of the cup shown in Figure 2.
Figure 1:
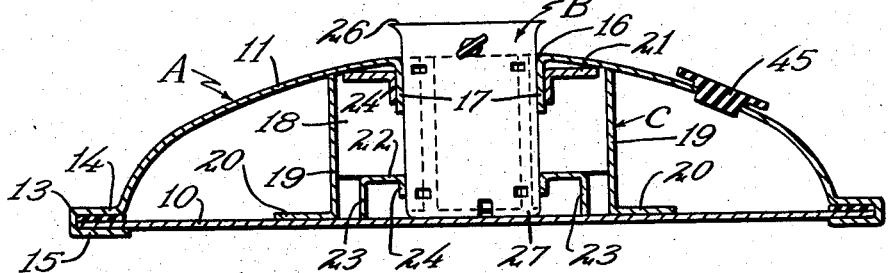
Figure 1 is a cross sectional plan view on a vertical plane through the combined tree holding cup and water container.

The stand or holder A is particularly designed to mount the tree cup B for the support of a Christmas tree or the like so as to hold trees of various sizes in upright position during a season of display. The holder A includes a disc-shaped lower base or wall 10 which may be formed of thin metal or plastic. An upper covering member 11 is secured to the lower base wall 10 in a manner as hereinafter described.

The upper covering member is preferably punched from a flat sheet of metal and is formed into concave shape by one or a series of forming operations and in the manner as illustrated in my previous Patent 2,337,914. The convex body is provided with a peripheral outwardly extending flange 13. When sealing the bottom member 10 to the upper member 11, a water or liquid sealing gasket 14 is interposed between the flange 13 and the marginal edge of the disc 10. The marginal edge 15 of the flange 13 is then bent downwardly and inwardly to enclose the marginal edge of the disc 10. The gasket 14 is pressed between the disc 10 and the flange 13, providing a liquid-proof joint.

At the center of the upper covering member 11, there is provided a receptacle receiving aperture 16 encircled by a downwardly projecting sleeve 17 which is pressed inwardly as an integral portion of the top 11. This sleeve 17 is drawn downwardly in a series of forming operations into the rounded aperture or cup-like opening 16. The sleeve 17, as an integral portion of the top 11, serves as a flange enclosure for liquid material in the container to avoid spilling when in a tipped position. Further, the sleeve 17 serves as a guide for the frame support and insert spacer C which is of the character as shown and described as B in my Patent 2,679,371.

The spacer support C is interposed into the stand A to form a support for the top member 11 and the cup B. This support C includes a back panel 18 and integral side panels 19. The side panels 19 are integral with base flanges 20. A top flange 21 is connected integral with the back panel 18 and a bottom flange 22 is connected integral with the bottom edge of back panel 18. Supporting flanges 23 are connected integral with the bottom flange 22.

A sleeve 24 of the outside diameter of cup B is punched from the top flange 21 and is downward directed to slip over and fit against sleeve 17. A sleeve 24' of the outside diameter of cup B is punched in the bottom flange 20' to extend downwardly therefrom to receive and support cup B from sidewise displacement. This frame spacer and support C is of larger relative size to seat cup B and is a cut and pressed out metal form as described in the above patent.

Figures 2, 4:
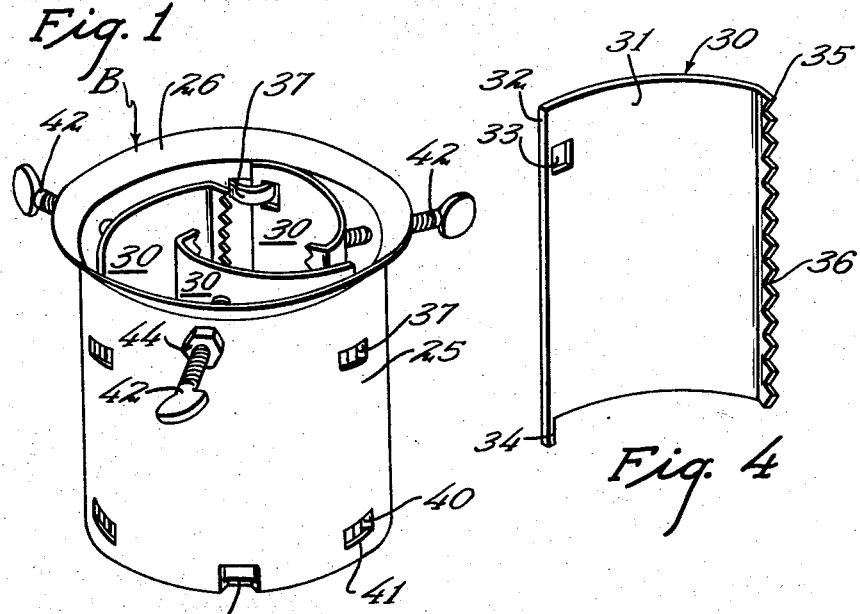
Figure 2 is a perspective view of the tree cup.
Figure 4 is a front plan view of one of the adjustable tree clamping plates fastened into the tree cup shown in Figures 2 and 3.

The cup portion B is a relatively heavy cast or molded metal form with a circular ring shaped wall portion 25, peripheral open flanged end 26 and bottom portion 27. In the bottom portion 27 at its juncture with the wall portion 25 a number of liquid inlet and outlet apertures are provided by cutting out small rectangular openings 28. As illustrated in Figure 3 in conjunction with Figure 2 the openings 28 are cut in the wall 25 and its integral bottom 27 at substantially equally spaced angular positions of about 120°.

The cup B is of fairly large diameter in order to fit about the base of fairly large Christmas trees. In order to securely clamp the cup B on the base of a tree there is provided a series of three adjustable clamping plates 30. In order to illustrate, one of the clamping plates 30 is shown in detail in Figure 4. As illustrated, the bodies 31 of plates 30 are of arcuate shape and of a curvature which permits them to be fitted in close abutting relation to the cylindrical shape of wall 25, to which they are hinged. At the hinging side 32, each of the bodies 31 are provided with rectangular apertures 33 and extended legs 34 along their hinge ends 32 and at the opposite tree gripping ends with inturned flanges 35 having serrated edges forming rows of teeth 36 for gripping into three sides of a tree base along its longitudinal axis.

To fasten the plates 30 within the cup B, the upper body portion 25 is provided with integral pressed in tongues 37. The tongues 37 are formed by cutting body 31 about the three sides of the tongues 37 and bending the center portions 38 thereof inwardly with the free tongue ends 39 open to slide into and through apertures 33. The lower body portion 25 is provided with inwardly looped indents 40 in alignment with tongues 37 to receive and hold the legs 34. The indents 40 are provided by cutting pairs of slightly spaced narrow parallel slots 41 and then bending or pressing in the metal of body 25 between the slots to form closed loops within which the legs 34 are pivotally mounted. Upon inserting the legs 34, of plates 30, within the indents 40 the tongue 37 is fitted through aperture 33 in plates 30 and the tongue end 39 is bent or pressed back towards the body 25 to lock the plates in hinged relation to the body 25. The three plates 30 are hinged to the body 25 at points which are substantially 120° apart or midway between the apertures 28. Thus there are provided additional liquid inlets and outlets which avoid spilling of liquid when the cup is tipped at any angle.

In order to provide a proper leverage force on the plates 30, to cause teeth 36 to bite into and firmly hold the cup B on the tree base a plurality of turn screws 42 are secured through suitable apertures 43 in cup body 25. As more clearly illustrated in Figure 2, the turn screws are held by suitable nuts 44 welded to the body 25 in alignment with the apertures 43. These turn screws are positioned to bear against the plates 30 near the serrated edge thereof and slide inwardly of the plates towards the apex of the bowed section thereof as they force the teeth 36 to bite into the tree base.

As will be apparent from the above description the cup B is aligned and fitted to a tree base before insertion into the holding stand A. Thus the handling of the tree in mounting is facilitated and inasmuch as the liquid container A is of relatively large capacity sufficient liquid is held thereby to keep the tree for a normal seasonal use. Otherwise tree preservative liquid can be added by removal of the filling hole plug 45, when desired. In addition the cup B and the container A are reinforced by the supporting insert structure 18.

In accordance with the patent statutes, I have described the principles of construction and operation of my Christmas tree holder, and while I have endeavored to set forth the best embodiment thereof, I desire to have it understood that changes may be made within the scope of the following claims without departing from the spirit of my invention.

What is claimed is:

1. A Christman tree stand including a cylindrical member into which the trunk of a tree is to extend, a plurality of arcuate clamping plates having one edge hingedly connected to vertically spaced portions of the inner wall of said cylindrical member, means carried by said cylindrical member for engaging said clamping plates at a locus spaced from each of said hinged edges for urging portions of said clamping plates against the tree trunk, and support means for retaining said cylindrical member in an upright position when the stand is placed upon a floor.

2. The structure of claim 1 wherein said engaging means includes a radially directed screw for each clamping plate, each screw being threadedly carried by said cylindrical member and having its inner end abutting its associated clamping plate intermediate said hinged edge and the free edge lying opposite thereto.

3. The structure of claim 2 wherein each free edge of the clamping plates is inturned and serrated.

4. A Christmas tree stand including a cylindrical member into which the trunk of a tree is to extend, said cylindrical member having a number of angularly spaced, inwardly projecting free tongues near the upper end thereof and an equal number of inwardly looped detents near its lower end in vertically spaced alignment with said tongues, a plurality of arcuate clamping plates each having an aperture adjacent one edge near its upper end for receiving one of said tongues and a downwardly projecting leg adjacent said one edge at the lower end for reception into the looped detent directly below the tongue received in its upper aperture, and a plurality of threaded screws extending radially through said cylindrical member at spaced angular locations so that each screw will engage an arcuate plate at a locus spaced from said one edge for urging said arcuate plates inwardly against the trunk of a tree disposed in said cylindrical member, and support means for retaining said cylindrical member in an upright position when the stand is placed upon a floor.

References Cited in the file of this patent

UNITED STATES PATENTS

| 224,624 | Albrecht | Feb. 17, 1880 |
| 1,124,780 | Miller et al. | Jan. 12, 1915 |
| 1,411,722 | Grenzebach | Apr. 4, 1922 |
| 1,770,853 | Johnson | July 15, 1930 |
| 2,029,281 | McCann | Jan. 28, 1936 |
| 2,559,317 | Perlstein | July 3, 1951 |
| 2,576,832 | Gibson | Nov. 27, 1951 |
| 2,679,371 | Meldrum | May 25, 1954 |